(12) United States Patent
Ogura

(10) Patent No.: US 12,725,132 B2
(45) Date of Patent: Sep. 1, 2026

(54) INFORMATION PROCESSING APPARATUS FOR ASSISTING IN INFORMATION MANAGEMENT FOR TIRE RECYCLING

(71) Applicant: BRIDGESTONE CORPORATION, Tokyo (JP)

(72) Inventor: Kenta Ogura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/874,224

(22) PCT Filed: Jun. 27, 2023

(86) PCT No.: PCT/JP2023/023846
§ 371 (c)(1),
(2) Date: Dec. 12, 2024

(87) PCT Pub. No.: WO2024/009852
PCT Pub. Date: Jan. 11, 2024

(65) Prior Publication Data

US 2025/0356325 A1 Nov. 20, 2025

(30) Foreign Application Priority Data

Jul. 8, 2022 (JP) ................................ 2022-110841

(51) Int. Cl.
*G06Q 10/30* (2023.01)
*G06Q 30/016* (2023.01)

(52) U.S. Cl.
CPC ........... *G06Q 10/30* (2013.01); *G06Q 30/016* (2013.01); *G06Q 2220/00* (2013.01)

(58) Field of Classification Search
CPC .. G06Q 10/30; G06Q 30/016; G06Q 2220/00; G06Q 10/20; G06Q 30/06;
(Continued)

(56) References Cited

U.S. PATENT DOCUMENTS

2003/0097310 A1* 5/2003 Ono ........................ G06Q 30/02 705/14.27
2007/0260466 A1* 11/2007 Casella .................. G06Q 10/30 705/308

(Continued)

FOREIGN PATENT DOCUMENTS

EP 3989133 A1 4/2022
JP 2002245209 A 8/2002

(Continued)

OTHER PUBLICATIONS

Apr. 10, 2025, search result of the Extended European Search Report issued by the European Patent Office in the corresponding European Patent Application No. 23835384.1.

(Continued)

*Primary Examiner* — Ryan W Sherwin
(74) *Attorney, Agent, or Firm* — KENJA IP LAW PC

(57) ABSTRACT

The present disclosure assists in managing information acquired at each stage of tire recycling. An information processing apparatus (1) capable of communicating with a network includes a controller. The controller executes operations including receiving first tire-related information about a tire from a first communication terminal (2) associated with a first stage in recycling of tires, receiving second tire-related information about the tire from a second communication terminal (2) associated with a second stage in the recycling, storing the first tire-related information and the second tire-related information in association with identification information for the tire, and transmitting, upon receiving the identification information from a user terminal (3), the first tire-related information and the second tire-related information to the user terminal (3).

8 Claims, 11 Drawing Sheets

(58) Field of Classification Search
CPC ...... G06Q 50/40; G06Q 10/08; G06Q 30/018; G06Q 50/04
See application file for complete search history.

(56) References Cited

U.S. PATENT DOCUMENTS

| | | | | |
|---|---|---|---|---|
| 2010/0087983 | A1* | 4/2010 | Boss | G06Q 10/20 701/31.4 |
| 2011/0153459 | A1* | 6/2011 | Kirian | G06Q 10/06 705/305 |
| 2016/0307169 | A1* | 10/2016 | Abdallah, Jr. | B29B 17/04 |
| 2020/0122533 | A1 | 4/2020 | Su et al. | |
| 2020/0143336 | A1* | 5/2020 | Klinkhamer | G06Q 20/40145 |

FOREIGN PATENT DOCUMENTS

| | | |
|---|---|---|
| JP | 2017182299 A | 10/2017 |
| JP | 2021166499 A | 10/2021 |

OTHER PUBLICATIONS

Toqeer Ali Syed et al., A Novel Blockchain-Based Framework for Vehicle Life Cycle Tracking: An End-to-End Solution, IEEE Access, 2020, pp. 111042-111063, vol. 8, XP011795313.

Dec. 18, 2024, International Preliminary Report on Patentability issued in the International Patent Application No. PCT/JP2023/023846.

Sep. 12, 2023, International Search Report issued in the International Patent Application No. PCT/JP2023/023846.

* cited by examiner

Tire recycling value chain
D-1
Collection
D-2
Processing
D-3
Treatment
D-4
Manufacturing
D-5
Sale
QR
TR
Slip
Slip
QR
QR
TR
QR
TR
QR

FIG. 6

| Tire ID | First tire-related information | Second tire-related information | Third tire-related information | … |
|---|---|---|---|---|
| 001 | A001 | A002 | A003 | … |
| ⋮ | ⋮ | ⋮ | ⋮ | ⋮ |

INFORMATION PROCESSING APPARATUS FOR ASSISTING IN INFORMATION MANAGEMENT FOR TIRE RECYCLING

CROSS-REFERENCE TO RELATED APPLICATION

The present application claims priority to Japanese Patent Application No. 2022-110841 filed on Jul. 8, 2022, the entire contents of which are incorporated herein by reference.

TECHNICAL FIELD

The present disclosure relates to an information processing apparatus, an information processing method, and a program.

BACKGROUND

Demand for the realization of a sustainable society is growing. In this regard, technology for managing component information for waste-derived ethanol by blockchain to ensure traceability is known. For example, see patent literature (PTL) 1.

CITATION LIST

Patent Literature

PTL 1: JP 2021-166499 A

SUMMARY

Technical Problem

The only information managed by the aforementioned background technology is composition information on waste-derived ethanol.

It is an aim of the present disclosure, conceived in light of these circumstances, to assist in managing information acquired at each stage of tire recycling.

Solution to Problem

An information processing apparatus according to an embodiment of the present disclosure is

[1]

an information processing apparatus capable of communicating with a network and including a controller, the controller being configured to execute operations including:

receiving first tire-related information about a tire from a first communication terminal associated with a first stage in recycling of tires;

receiving second tire-related information about the tire from a second communication terminal associated with a second stage in the recycling;

storing the first tire-related information and the second tire-related information in association with identification information for the tire; and transmitting, upon receiving the identification information from a user terminal, the first tire-related information and the second tire-related information to the user terminal.

An information processing apparatus according to an embodiment of the present disclosure is

[2]

the information processing apparatus according to [1], wherein the information processing apparatus is one node of a blockchain network, and the operations include storing the first tire-related information and the second tire-related information in association with the identification information in a blockchain.

An information processing apparatus according to an embodiment of the present disclosure is

[3]

the information processing apparatus according to [1] or [2], wherein a QR code® (QR code is a registered trademark in Japan, other countries, or both) including the identification information, a bar code including the identification information, or an RFID chip storing the identification information is attached to or embedded in the tire, or a chemical marker associated with the identification information is compounded with or applied to rubber used in the tire.

An information processing apparatus according to an embodiment of the present disclosure is

[4]

the information processing apparatus according to any one of [1] to [3], wherein the first tire-related information includes information on a percentage of recycled material used in the tire.

An information processing apparatus according to an embodiment of the present disclosure is

[5]

the information processing apparatus according to any one of [1] to [4], wherein the first stage is a stage of selling the tire, and the operations include identifying a customer who purchased the tire from the first tire-related information and transmitting service information to a user terminal operated by the customer.

An information processing apparatus according to an embodiment of the present disclosure is

[6]

the information processing apparatus according to any one of [1] to [4], wherein the first stage is a stage of selling the tire, the second stage is a stage of collecting a used tire, and the operations include calculating, from the first tire-related information and the second tire-related information, a percentage of one or more tires collected among one or more tires sold.

An information processing apparatus according to an embodiment of the present disclosure is

[7]

the information processing apparatus according to any one of [1] to [4], wherein the second stage is a stage of pyrolysis of the tire, and the operations include transmitting decomposition condition information corresponding to compounding information included in the first tire-related information to the second communication terminal associated with the second stage.

An information processing method according to an embodiment of the present disclosure is

[8]

an information processing method for an information processing apparatus capable of communicating with a network, the information processing method including:

receiving first tire-related information about a tire from a first communication terminal associated with a first stage in recycling of tires;

receiving second tire-related information about the tire from a second communication terminal associated with a second stage in the recycling;

storing the first tire-related information and the second tire-related information in association with identification information for the tire; and transmitting, upon receiving the identification information from a user terminal, the first tire-related information and the second tire-related information to the user terminal.

A program according to an embodiment of the present disclosure is

[9]

a program configured to cause a computer to function as the information processing apparatus according to any one of [1] to [7].

Advantageous Effect

According to an embodiment of the present disclosure, assistance in managing information acquired at each stage of tire recycling can be provided.

BRIEF DESCRIPTION OF THE DRAWINGS

In the accompanying drawings:

FIG. 6 is a diagram illustrating a data structure of a tire-related information DB (database);

DETAILED DESCRIPTION

Figure 1:
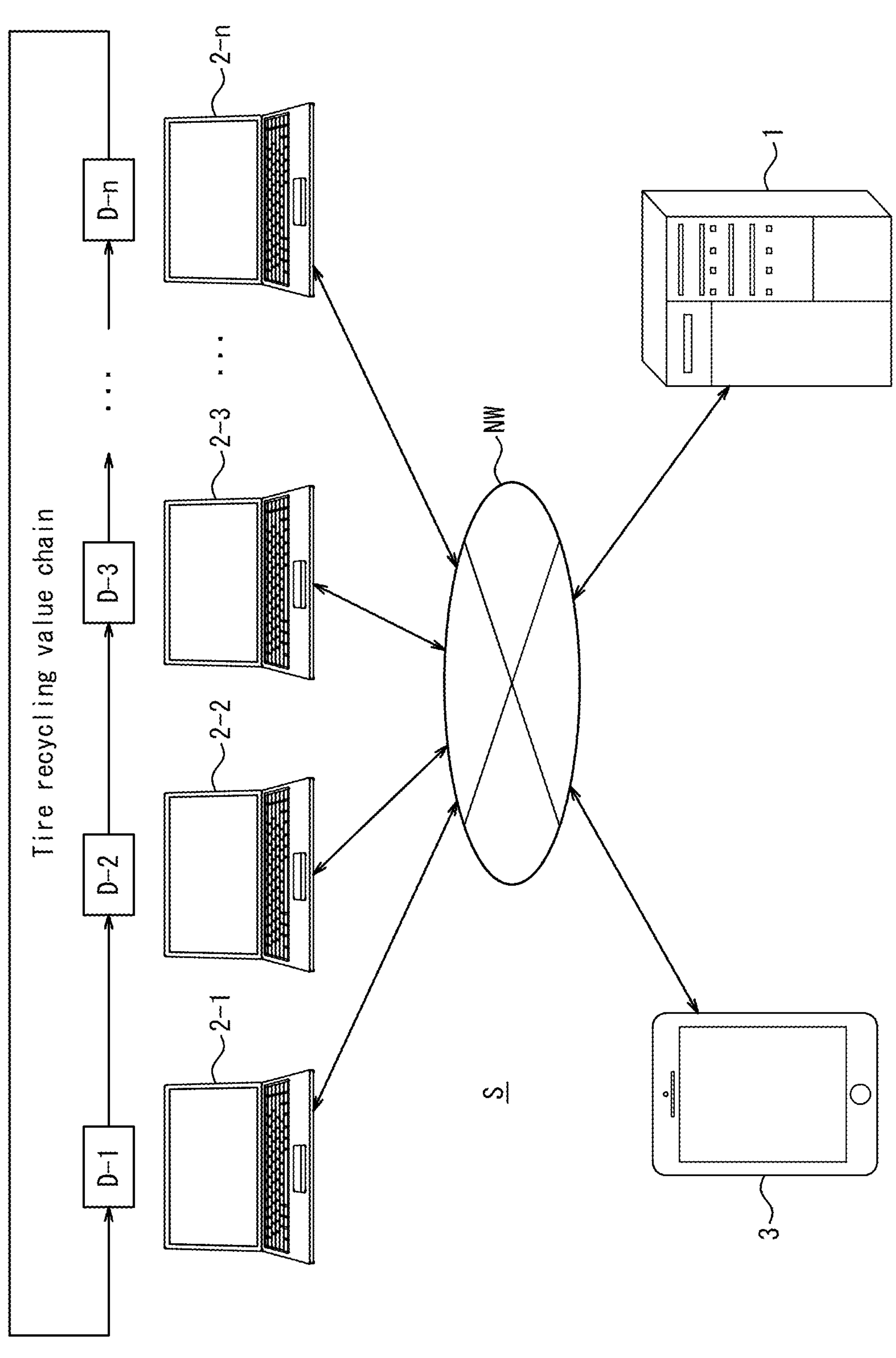
FIG. 1 is a schematic diagram of an information processing system.

FIG. 1 is a schematic diagram of an information processing system S in the present embodiment. The information processing system S includes an information processing apparatus 1, a communication terminal 2, and a user terminal 3, which can communicate with each other via a network NW. For the sake of explanation, any or all of the communication terminal 2-1, communication terminal 2-2, communication terminal 2-3, . . . , communication terminal 2-*n* (n: a natural number two or higher) are also referred to as the communication terminal 2. The network NW includes a mobile communication network and the Internet, for example, and includes at least one of wired and wireless communication.

In FIG. 1, for the sake of explanation, one information processing apparatus 1 and one user terminal 3 are illustrated. However, the number of each of the information processing apparatus 1 and user terminal 3 is not limited to one. For example, the processing executed by the information processing apparatus 1 in the present embodiment may be executed by a plurality of distributed information processing apparatuses 1.

The information processing apparatus 1 is installed in a data center or other facility. The information processing apparatus 1 is a computer, such as a server belonging to a cloud computing system or other computing system.

Figure 2:
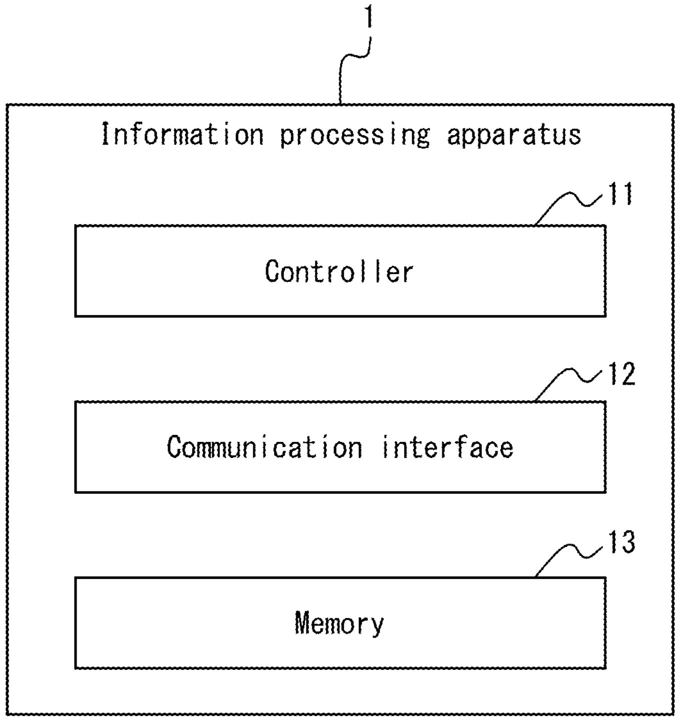
FIG. 2 is a block diagram illustrating a configuration of an information processing apparatus.

The internal configuration of the information processing apparatus 1 is described in detail with reference to FIG. 2.

The information processing apparatus 1 includes a controller 11, a communication interface 12, and a memory 13. The components of the information processing apparatus 1 are communicably connected to each other via dedicated wires, for example.

The controller 11 includes one or more general-purpose processors, including a central processing unit (CPU) or micro processing unit (MPU), for example. The controller 11 may include one or more dedicated processors specialized for particular processing. Instead of including a processor, the controller 11 may include one or more dedicated circuits. The dedicated circuit may, for example, be a field-programmable gate array (FPGA) or an application specific integrated circuit (ASIC). The controller 11 may include an electronic control unit (ECU). The controller 11 transmits and receives any information via the communication interface 12.

The communication interface 12 includes a communication module compliant with one or more wired or wireless local area network (LAN) standards for connection to the network NW. The communication interface 12 may include a module compliant with one or more mobile communication standards, including long term evolution (LTE), $4^{th}$ generation (4G), or $5^{th}$ generation (5G). The communication interface 12 may include a communication module or the like compliant with one or more short-range communication standards or specifications, including Bluetooth®, AirDrop®, IrDA, ZigBee®, Felica®, or RFID (Bluetooth, AirDrop, ZigBee, and Felica are each a registered trademark in Japan, other countries, or both). The communication interface 12 transmits and receives any information via the network NW.

The memory 13 includes a semiconductor memory, a magnetic memory, an optical memory, or a combination of at least two of these, for example, but is not limited to these examples. The semiconductor memory is, for example, RAM or ROM. The RAM is, for example, SRAM or DRAM. The ROM is, for example, EEPROM. The memory 13 may, for example, function as a main memory, an auxiliary memory, or a cache memory. The memory 13 may store information resulting from analysis or processing by the controller 11. The memory 13 may store various information and the like related to the operation or control of the information processing apparatus 1. The memory 13 may store system programs, application programs, embedded software, and the like. The programs may, for example, be in Python but are limited to Python. The memory 13 may be external to the information processing apparatus 1 and may be accessed by the information processing apparatus 1. The memory 13 includes a tire-related information DB, described below.

The communication terminal 2 may be a general-purpose device, such as a PC, or a dedicated device. "PC" is an abbreviation of personal computer. As alternative examples, the communication terminal 2 may be a mobile device such as a cell phone, a smartphone, a wearable device, or a tablet. Each of the communication terminals 2 may be a different form of terminal. For example, the communication terminal 2-1 may be a PC, and the communication terminal 2-2 may be a cell phone.

Figure 3:
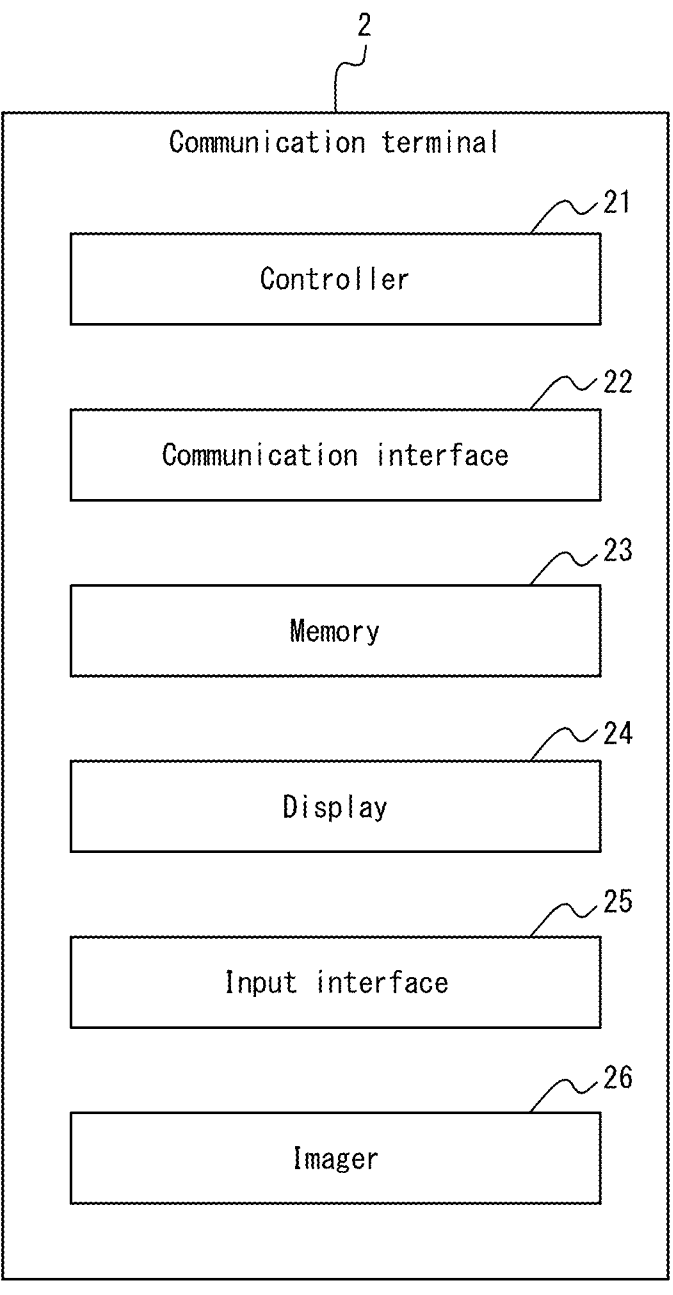
FIG. 3 is a block diagram illustrating a configuration of a communication terminal.

The internal configuration of the communication terminal 2 is described in detail with reference to FIG. 3.

The communication terminal 2 includes a controller 21, a communication interface 22, a memory 23, a display 24, an input interface 25, and an imager 26. The components of the communication terminal 2 are communicably connected to each other via dedicated wires, for example.

A description of the hardware configuration of the controller 21, communication interface 22, and memory 23 of the communication terminal 2 may be identical to the description of the hardware configuration of the controller 11, communication interface 12, and memory 13 of the information processing apparatus 1. A description thereof is omitted here.

The display 24 is, for example, a display. The display is, for example, an LCD or an organic EL display. “LCD” is an abbreviation of liquid crystal display. “EL” is an abbreviation of electro luminescence. Instead of being provided in the communication terminal 2, the display 24 may be connected to the communication terminal 2 as an external output device. Any appropriate connection method can be used, such as USB, HDMI® (HDMI is a registered trademark in Japan, other countries, or both), or Bluetooth®. “USB” is an abbreviation of Universal Serial Bus. “HDMI®” is an abbreviation of High-Definition Multimedia Interface.

The input interface 25 is, for example, physical keys, capacitance keys, a pointing device, a touchscreen provided integrally with a display, or a microphone. The input interface 25 receives operations to input information used in operations of the communication terminal 2. Instead of being provided in the communication terminal 2, the input interface 25 may be connected to the communication terminal 2 as an external input device.

The imager 26 includes a camera, for example. The imager 26 can capture images of the surroundings. For image analysis, the imager 26 may record the captured images in the memory 23 or transmit the images to the controller 21. The images may include still or moving images. Instead of being provided in the communication terminal 2, the imager 26 may be connected to the communication terminal 2 as an external input device.

The user terminal 3 may be a general-purpose device, such as a PC, or a dedicated device. “PC” is an abbreviation of personal computer. As alternative examples, the user terminal 3 may be a mobile device such as a cell phone, a smartphone, a wearable device, or a tablet.

Figure 4:
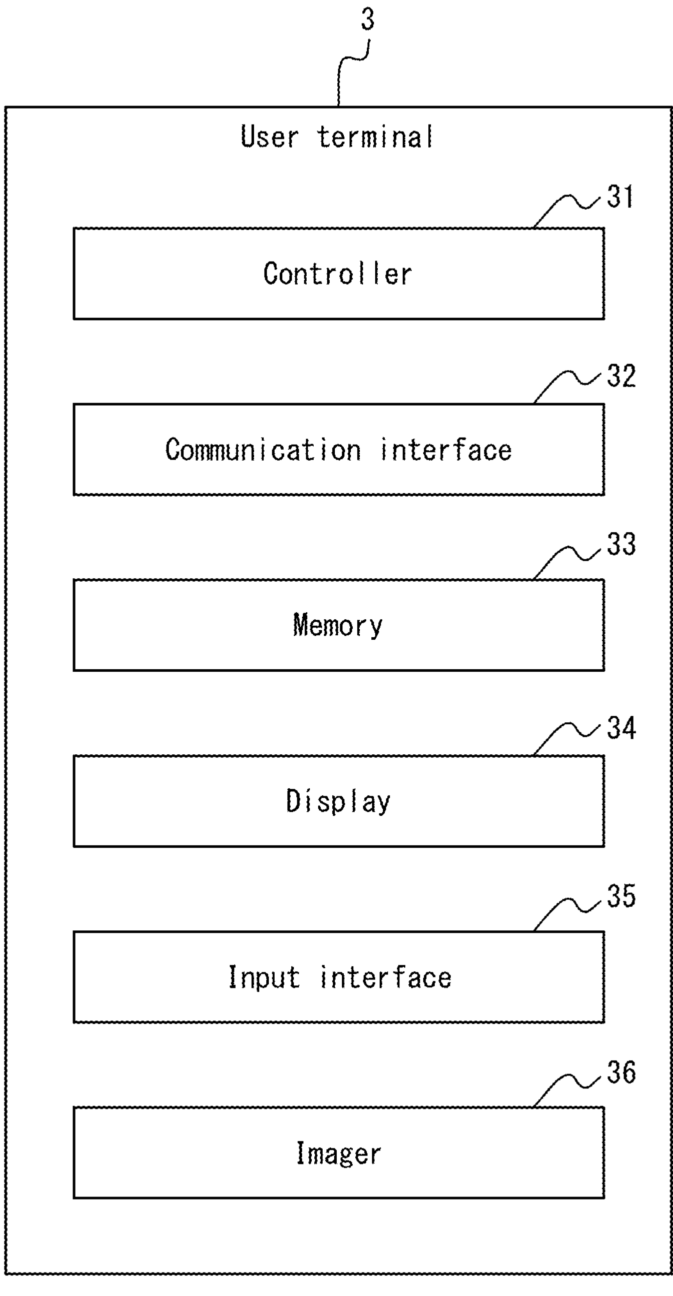
FIG. 4 is a block diagram illustrating a configuration of a user terminal.

The internal configuration of the user terminal 3 is described in detail with reference to FIG. 4.

The user terminal 3 includes a controller 31, a communication interface 32, a memory 33, a display 34, an input interface 35, and an imager 36. The components of the user terminal 3 are communicably connected to each other via dedicated wires, for example.

A description of the hardware configuration of the controller 31, communication interface 32, memory 33, display 34, input interface 35, and imager 36 of the user terminal 3 may be identical to the description of the hardware configuration of the controller 21, communication interface 22, memory 23, display 24, input interface 25, and imager 26 of the communication terminal 2. The description thereof is omitted here.

The information processing method for the information processing apparatus 1 is described below in detail. As illustrated in FIG. 1, the communication terminal 2-1, communication terminal 2-2, communication terminal 2-3, . . . and communication terminal 2-*n* are associated respectively with a stage D-1, stage D-2, stage D-3, . . . stage D-n in tire recycling. Specifically, the communication terminal 2-1, communication terminal 2-2, communication terminal 2-3, . . . and communication terminal 2-*n* are respectively operated by the person in charge of stage D-1, stage D-2, stage D-3, . . . and stage D-n in tire recycling. The chain of stages in tire recycling is also referred to as a value chain. As an alternative example, the communication terminal 2-1, communication terminal 2-2, communication terminal 2-3, . . . and communication terminal 2-*n* may respectively be operated by the person in charge of stage D-1, stage D-2, stage D-3, . . . and stage D-n in recycling of a tire containing 50% or more, preferably 100%, of sustainability-related materials (for example, materials derived from non-fossil resources, materials derived from biotechnology, materials derived from recycling, and the like).

The inclusion of sustainable materials can be derived by any calculation method, such as the sum of the sustainable material weight per tire weight, or the ratio of the number of sustainable material parts in the compound when the rubber component is set at 100.

Figure 5:
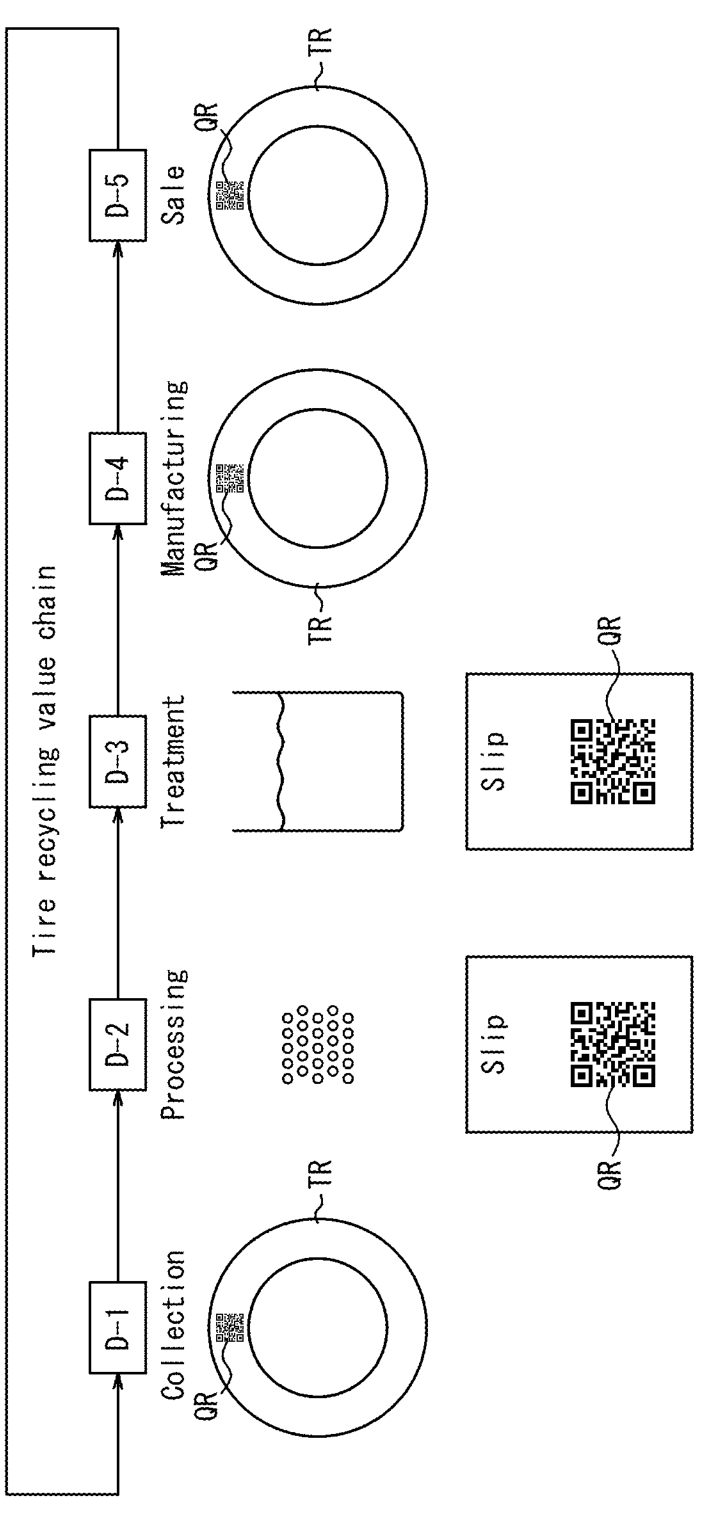
FIG. 5 is a diagram illustrating a value chain of tire recycling.

As illustrated in FIG. 5, the various stages in tire recycling are as follows.

Stage D-1: used tire collection stage

Stage D-2: processing stage of collected tires (for example, sorting of tire types or components, removal of non-rubber materials, crushing of tires)

Stage D-3: treatment stage of the processed tire (for example, impurity removal, swelling, decomposition, depolymerization, polymerization, oil production, refining, lightening, chemical conversion)

Stage D-4: manufacturing stage of new tires using recycled materials

Stage D-5: sales stage of manufactured tires

The content of each stage and the number of stages can be changed freely.

As illustrated in FIG. 5, a QR code® is attached to a tire TR collected in stage D-1. This QR code® may be imprinted during the tire manufacturing process, or may be printed on or affixed to the tire surface at any time, such as when the tire is shipped from the manufacturing plant, sold at a tire retail store, or collected after use.

The QR code® includes identification information for the tire TR. In the present embodiment, each tire in a plurality of tires is assigned identification information that uniquely identifies the tire TR. The QR code® is read by the communication terminal 2. The communication terminal 2 functions as a QR code reader that uses the controller 21 and the imager 26.

As an alternative example, the QR code® can be replaced by a bar code, RFID chip, or chemical marker. That is, a bar code containing identification information may be attached to the tire TR. An RFID chip storing the identification information may be attached to the tire TR or embedded in the tire TR. The chemical marker that includes the identification information is a specific chemical compounded in the rubber of the tire TR and may be included in the tire TR. The identification information included in the bar code, RFID chip, or chemical marker is read by the communication terminal 2. The communication terminal 2 functions as a barcode reader or an RFID reader. At least two of the QR code®, bar code, RFID chip, and chemical marker may be used together. For example, an RFID chip may be used in certain stages of recycling, while a QR code® may be used in other stages (for example, the stage of selling to consumers).

After collecting the tire TR, the person in charge of stage D-1 reads the identification information for the tire TR using the communication terminal 2-1. The person in charge uses the communication terminal 2-1 to access the information processing apparatus 1. Information such as a URL to be accessed may be included in the QR code. The person in charge registers the first tire-related information collected in stage D-1 in the information processing apparatus 1 in association with the identification information for the tire TR. The first tire-related information may, for example, include at least one of the following.

wear information (amount of tread wear or the like)
deterioration information
years of use
size
tire manufacturer
tire type (for passenger vehicles, trucks/buses, mining vehicles, aircraft, or the like)
percentage of tires collected (recycled) among tires sold
$CO_2$ emissions in the tire transportation process
information on tire failure
reduction of $CO_2$ emissions during vehicle operation
where tire was brought from Upon receiving the first tire-related information and the identification information from the communication terminal 2-1, the information processing apparatus 1 stores the first tire-related information in association with the identification information (corresponding to the "tire ID") in the tire-related information DB of the memory 13, as illustrated in FIG. 6.

The collected tire TR is sent to the next stage D-2. In stage D-2, the tire TR is processed. The tire TR is crushed together with the QR code®. A QR code® identical to the QR code® of the tire TR may be printed on a slip or the like for the tire TR or may be affixed to each batch of boxes or containers holding chips. The person in charge of stage D-2 accesses the information processing apparatus 1 using the communication terminal 2-2. The person in charge registers the second tire-related information collected in stage D-2 in the information processing apparatus 1 in association with the identification information read from the QR code®. The second tire-related information may, for example, include at least one of the following.

information on crushing company
chip size
whether products from other companies are mixed in
tire portion before chip processing (tread, side, or the like)
amount of $CO_2$ generated Upon receiving the second tire-related information and the identification information from the communication terminal 2-2, the information processing apparatus 1 stores the second tire-related information in association with the identification information, as illustrated in FIG. 6.

As an alternative example, in stage D-2, a plurality of tires may be processed simultaneously to generate tire chips. In this case, the generated plurality of tire chips may be managed as one collection by batch for each box, container, or the like. The controller 11 of the information processing apparatus 1 can assign one piece of identification information (for example, one QR code) to one collection. The assigned identification information may be stored in the memory 13 in association with a plurality of pieces of identification information corresponding to a plurality of unprocessed tires. In this way, the controller 11 of the information processing apparatus 1 can grant one new piece of identification information and associate the one new piece of identification information with a previous plurality of pieces of identification information. The controller 11 of the information processing apparatus 1 can thus associate one piece of identification information at one stage with a plurality of pieces of identification information at another stage. Such an association can be made at any stage.

The tire TR is sequentially set to stages D-3, D-4, and D-5. The operations performed by the person in charge at each stage are similar to those performed at stages D-1 and D-2 and therefore will not be described again. In other words, the person in charge at each stage reads the identification information from the QR code® using the communication terminal 2 and registers the tire-related information collected at each stage in the information processing apparatus 1 in association with the identification information.

Stage D-3, which is the treatment stage, may include a process to separate tire chips into oil, carbon black, silica, and the like by a method such as thermal decomposition or gasification, and processes A through C, described below, for converting oil to synthetic rubber. Here, the recycled oil may be managed in a mass balance system, since the connection between the recycled oil as an object and the original tire is lost.

Process A: pyrolysis oil (r-naphtha) is mixed with petroleum-derived naphtha and charged into a naphtha cracker.

Process B: the C2, C3, and C4 fractions are separated by cracking, and the C4 fraction (butadiene) is extracted.

Process C: synthetic rubber is produced from the extracted butadiene. The produced synthetic rubber is used in stage D-4, described below, to manufacture tires. At the time of stage D-4, there is not a 1:1 match between the pre-recycled tire and the butadiene rubber derived from the recycled oil. However, a predetermined percentage of the synthetic rubber delivered by the mass balance method is guaranteed to be derived from recycled oil. The identification information assigned to the tire chip may be reassigned with respect to the predetermined percentage, or only new information, such as the amount of recycled material used, may be assigned without use of the identification information that was assigned to the tire chip.

Carbon black and silica may be recycled into raw materials through surface treatment or other processes as necessary.

As an alternative example, if a dedicated line for recycled naphtha is introduced in stage D-3, the mass balance method need not be used. The produced synthetic rubber is treated as a 100% recycled product. The identification information assigned to the tire chip may be reassigned with respect to the synthetic rubber, or only new information, such as the amount of recycled material used, may be assigned without use of the identification information that was assigned to the tire chip.

The third tire-related information collected in stage D-3 may, for example, include at least one of the following.

information on oil produced from tires (viscosity, molecular weight, amount of impurities, molecular structure)
information on carbon black obtained from tires (ash content, pH, particle size, sulfur content, sieve residue, toluene extract, and the like)
information on silica produced from tires
container identification information
catalyst information
monomer information pyrolysis temperature of tire amount of $CO_2$ generated The fourth tire-related information collected in stage D-4, which is the new tire manufacturing stage, may, for example, include at least one of the following.

compounding information on the manufactured tire (the compounding amount of each material, detailed information on each material, information on the origin of each material, such as derived from non-fossil resources, bio-derived, or derived from recycled materials, and the like)

$CO_2$ emissions during manufacturing percentage of recycled material (such as recycled rubber) in the manufactured tire percentage of sustainable materials (derived from non-fossil resources, bio-derived, derived from recycled materials, or the like) used in the manufactured tire The QR code® including the identification information for the tire TR may be affixed to the tire TR at stage D-4 or printed on a slip attached to the tire TR.

The fifth tire-related information collected in stage D-5, which is the stage of selling the tire TR, may, for example, include at least one of the following.

information on the customer who purchased the tire distributor information amount of $CO_2$ generated The QR code including the identification information for the tire TR may be affixed to the tire TR at stage D-5 or printed on a slip or product label attached to the tire TR.

As illustrated in FIG. 6, the controller 11 of the information processing apparatus 1 stores the tire-related information received from each stage in the memory 13 in association with the identification information for the tire TR.

The recycling illustrated in FIG. 5 may be performed over multiple cycles, rather than just one. In the case in which multiple cycles of recycling are performed, the controller 11 can store all tire-related information acquired in the multiple cycles.

As an additional or alternative example, the information processing apparatus 1 may be one node of a blockchain network, or an apparatus that can access nodes of a blockchain network.

Figure 7:
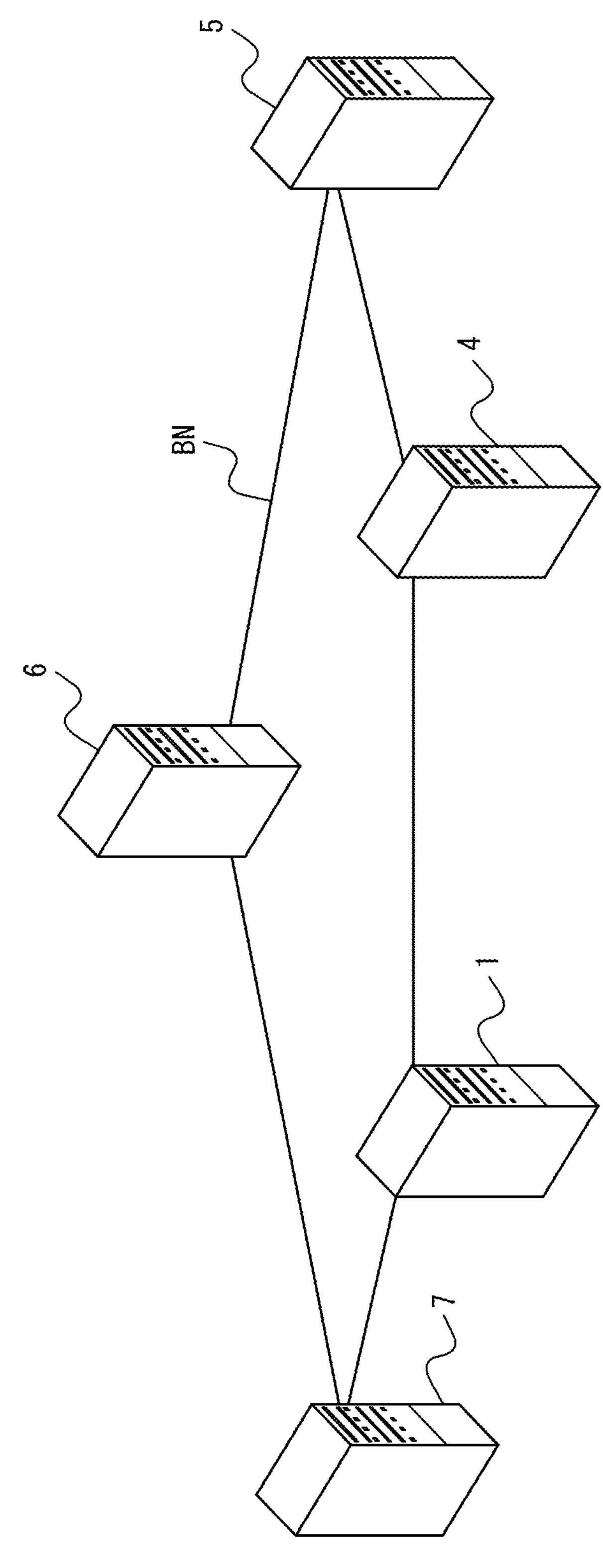
FIG. 7 is a diagram illustrating a blockchain network.

As illustrated in FIG. 7, the information processing apparatus 1 may be one of the nodes communicably connected to a blockchain network BN. The information processing apparatus 1 can communicate with one or more other information processing apparatuses 4 to 7 via the blockchain network BN. Although five information processing apparatuses are illustrated in FIG. 7, the number of information processing apparatuses is arbitrary. The hardware configuration of the information processing apparatuses 4 through 7 is identical to that of the information processing apparatus 1. Hence, a description thereof is omitted.

The blockchain network BN is a distributed ledger (Hyperledger) type. All nodes connected to the blockchain network BN hold the same data in chronological order as one or more blocks. The blockchain network BN may be a public, private, or consortium type blockchain network.

Figure 8:
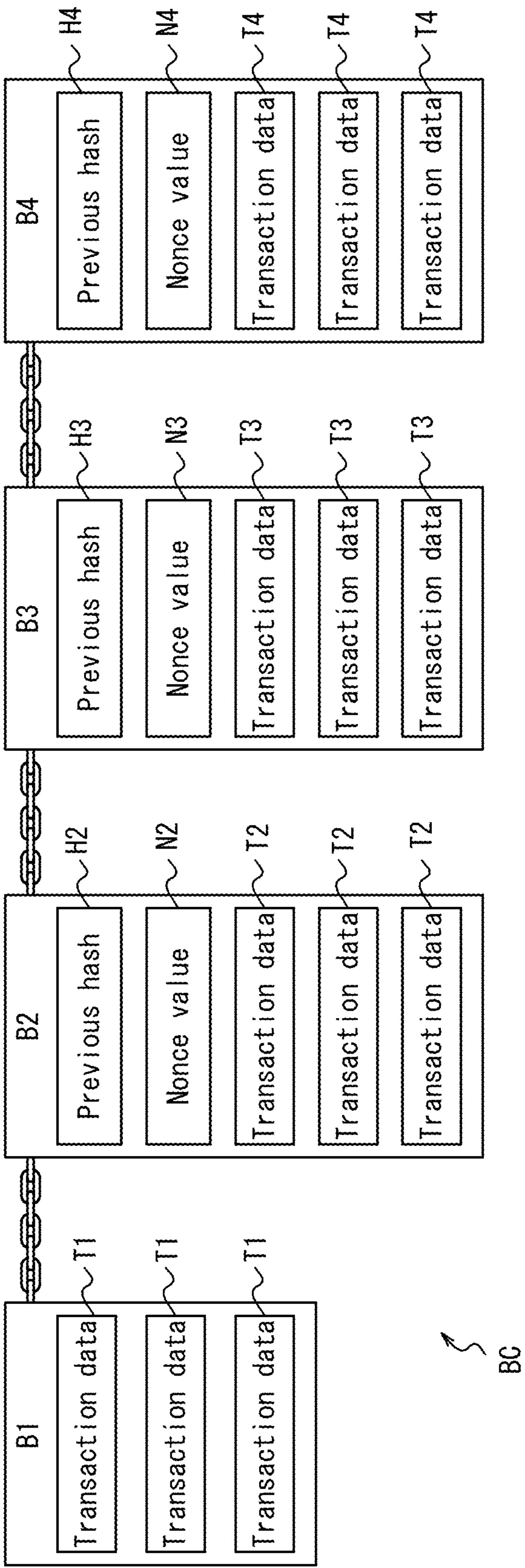
FIG. 8 is a diagram illustrating a blockchain.

As illustrated in FIG. 8, the memory 13 of the information processing apparatus 1 stores a blockchain BC. The blockchain BC is shared by all nodes in the blockchain network BN. For the sake of explanation, the case in which the blockchain BC includes a first block B1, a second block B2, a third block B3, and a fourth block B4 is described here. The number of blocks included in the blockchain BC is arbitrary.

The first block B1 is the initial block in the blockchain BC and contains transaction data T1. In FIG. 8, one block contains three pieces of transaction data. However, the number of pieces of transaction data contained in one block is arbitrary. The second block B2 contains a hash H2 of the first block B1, which is the previous block, a nonce value N2 corresponding to the hash H2, and transaction data T2. The description of the third block B3 and the fourth block B4 is omitted to avoid a duplicate description.

The controller 11 of the information processing apparatus 1 may store the identification information for the tire TR and the tire-related information in the blockchain BC. The controller 11 may store the records corresponding to one piece of identification information for a tire TR in one block or may store the identification information and tire-related information received from each stage in different blocks for each stage.

As an alternative example, an electronic authentication or digital signature system may be used to record or manage tire-related information instead of a blockchain.

First Method of Using Tire-Related Information

Figure 9:
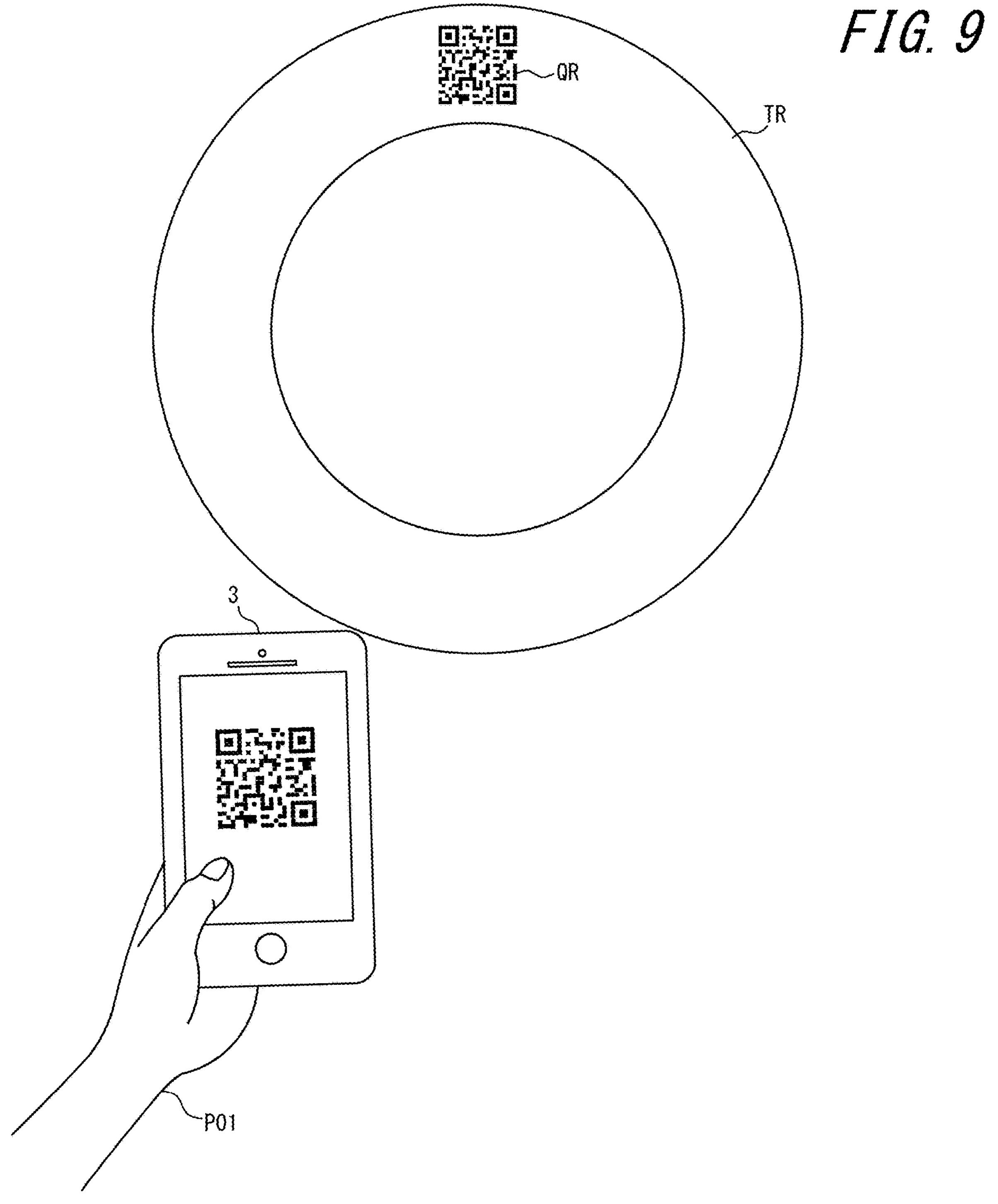
FIG. 9 is a diagram illustrating a method of acquiring tire-related information.

As illustrated in FIG. 9, any user P01, such as a customer considering the purchase of a tire TR in stage D-5, a company associated with the tire TR, or the person in charge of each stage (for example, sales staff selling the tire TR in stage D-5) may use the user terminal 3 to read the QR code® of the tire TR. The QR code® may be replaced by a bar code, RFID chip, or the like. Upon reading the QR code®, the controller 31 of the user terminal 3 accesses the information processing apparatus 1 and transmits the identification information contained in the QR code®. The controller 11 requests that the tire-related information associated with the identification information for the tire TR be transmitted. Upon receiving the identification information for the tire TR from the user terminal 3, the controller 11 of the information processing apparatus 1 acquires at least a portion of the tire-related information associated with the identification information from the memory 13. The controller 11 transmits the tire-related information to the user terminal 3.

Figure 10:
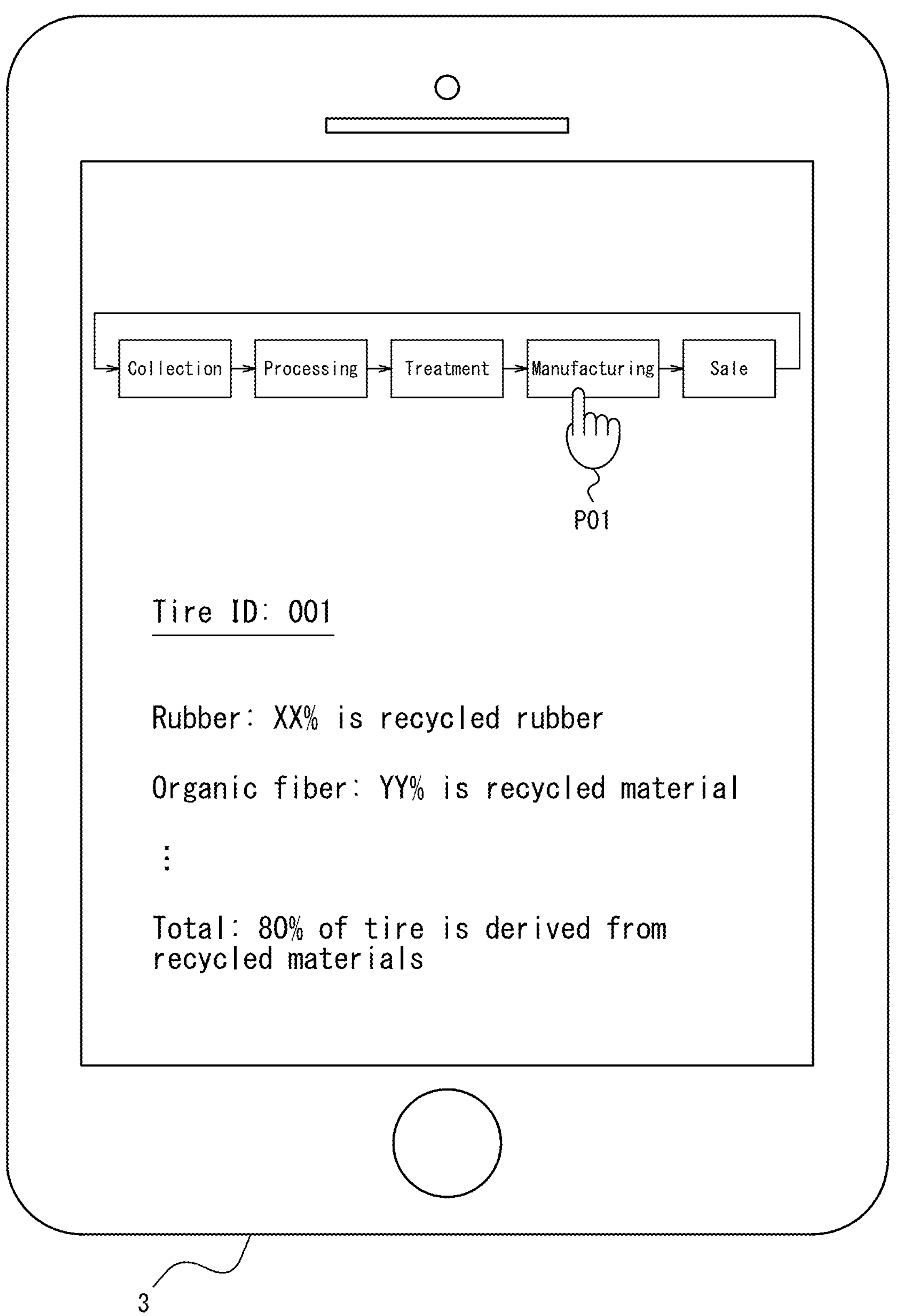
FIG. 10 is a diagram illustrating an example display of tire-related information.

FIG. 10 illustrates an example of the display of tire-related information on the display 34 of the user terminal 3. In FIG. 10, each stage is displayed in a selectable manner. Upon detecting that the "manufacturing" icon has been selected by the user P01, the controller 11 of the information processing apparatus 1 retrieves, from the memory 13, the tire-related information stored in association with the manufacturing stage. The controller 11 transmits the tire-related information to the user terminal 3 for display on the user terminal 3. As the tire-related information, the user terminal 3 displays the percentage of recycled materials used with regard to each of rubber, compounding agents, organic fiber, steel cords, and the like, and the fact that 80% of the entire tire TR is derived from recycled materials.

Second Method of Using Tire-Related Information

The controller 11 can determine how the information (performance, physical properties, and the like) acquired in a particular cycle of recycling (for example, the first cycle) has changed in subsequent cycles of recycling (for example, the second cycle). For example, the controller 11 determines how the breaking strength of rubber, molecular weight of synthetic rubber, molecular weight of oil, and the like have changed in each cycle of recycling. The controller 11 can transmit the content of the determination to the user terminal 3.

Third Method of Using Tire-Related Information

The controller 11 calculates what percentage of new tires have been recycled at any given point in time. For example, the controller 11 may calculate what percentage of new tires have been recycled based on the amount of recycled material used or related information, recorded at the tire manufacturing stage, among the identification information read from one or more new tires at stage D-5, which is the sales stage. The controller 11 transmits the calculation results to the user terminal 3.

Fourth Method of Using Tire-Related Information

The controller 11 may provide the tire-related information collected at a particular stage to the person in charge of the next stage. For example, the controller 11 receives the tire compounding information from the communication terminal 2-2 in stage D-2, in which the tire is processed, and reads the decomposition condition information corresponding to the compounding information from the memory 13. The controller 11 transmits the read decomposition conditions to the communication terminal 2-3 in stage D-3, in which pyrolysis is performed. For example, the controller 11 transmits different decomposition condition information to the communication terminal 2-3 according to whether the components of the tire TR in the compounding information are carbon-based, silica-based, synthetic rubber-based or natural rubber-based.

Fifth Method of Using Tire-Related Information

Upon detecting that the tire TR has been purchased in stage D-5, which is the sales stage, the controller 11 identifies the purchasing user from the tire-related information. The controller 11 reads the contact information for the user terminal 3 of the purchasing user from the memory 13 or the like. The controller 11 transmits service information corresponding to the purchased tire TR to the user terminal 3. The service information may, for example, be that the user can receive a discount at a particular gas station, a discount at a particular tire retailer, or the like.

Flowchart

Figure 11:
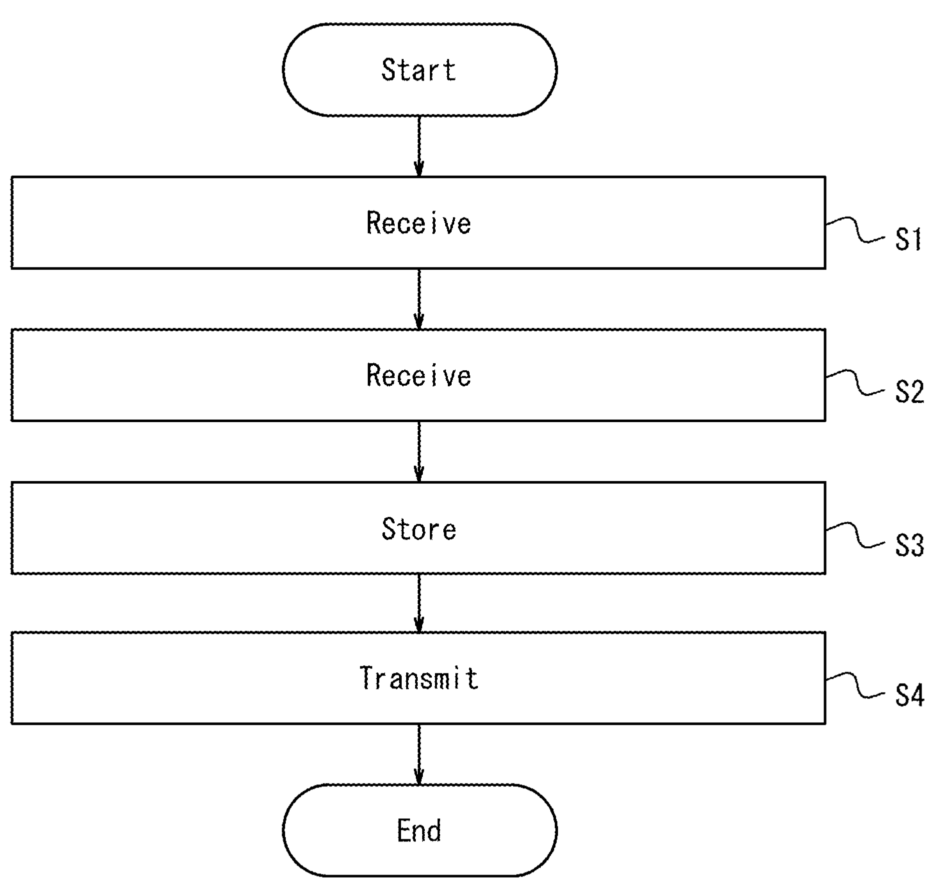
FIG. 11 is a flowchart illustrating operations executed by the information processing apparatus.

With reference to FIG. 11, an information processing method for the controller 11 of the information processing apparatus 1 is described.

In step S1, the controller 11 receives the first tire-related information from the first communication terminal 2 (which may be any of 2-1, 2-2, . . . , **2-*n*) via the communication interface 12. In step S2, the controller 11 receives the second tire-related information from the second communication terminal 2 (which may be any of 2-1, 2-2, . . . , 2-*n*) via the communication interface 12**.

In step S3, the controller 11 stores the first tire-related information and the second tire-related information in association with the tire identification information.

Upon receiving the identification information from the user terminal 3 in step S4, the controller 11 transmits the first tire-related information and the second tire-related information to the user terminal 3.

Effects

As described above, in the present embodiment, the controller 11 of the information processing apparatus 1 executes operations including receiving first tire-related information about a tire from a first communication terminal 2 associated with a first stage in recycling of tires, receiving second tire-related information about the tire from a second communication terminal 2 associated with a second stage in the recycling, storing the first tire-related information and the second tire-related information in association with identification information for the tire, and transmitting, upon receiving the identification information from a user terminal 3, the first tire-related information and the second tire-related information to the user terminal 3. With this configuration, the information processing apparatus 1 can assist in the management, sharing, and utilization of information acquired at each stage of tire recycling, thereby enhancing traceability. For example, the information processing apparatus 1 can use tire-related information to implement efficient recycling, to collaborate within related companies, or to disclose information to customers. In these ways, the information processing apparatus 1 can encourage recycling, promote the use of recycled materials, or promote the popularization of tires made from recycled materials.

According to the present embodiment, the information processing apparatus 1 is one of the nodes of a blockchain network, and the operations of the controller 11 include storing the first tire-related information and the second tire-related information in association with the identification information in the blockchain. When blockchain technology is used in this way, the registration information is distributed and shared by all nodes, making tampering difficult. The information processing apparatus 1 can thereby achieve a highly secure system.

According to the present embodiment, a QR code® including the identification information, a bar code including the identification information, or an RFID chip storing the identification information is attached to or embedded in the tire, or a chemical marker associated with the identification information is compounded with or applied to rubber used in the tire. This configuration enables the information processing apparatus 1 to acquire the identification information in a variety of ways.

According to the present embodiment, the first tire-related information includes information on the percentage of recycled material used in the tire. This configuration enables the information processing apparatus 1 to provide recycling information to the customer, thereby providing an incentive to purchase the tire.

According to the present embodiment, the first stage is a stage of selling the tire, and the operations include identifying a customer who purchased the tire from the first tire-related information and transmitting service information to a user terminal 3 operated by the customer. This configuration enables the information processing apparatus 1 to provide service to the customer after the purchase.

According to the present embodiment, the first stage is a stage of selling the tire, and the second stage is a stage of collecting a used tire. The operations of the controller 11 include calculating, from the first tire-related information and the second tire-related information, a percentage of one or more tires collected among one or more tires sold. This configuration enables the information processing apparatus 1 to determine the tire recycling status.

According to the present embodiment, the second stage is a stage of pyrolysis of the tire, and the operations include transmitting decomposition condition information corresponding to compounding information included in the first tire-related information to the second communication terminal associated with the second stage. This configuration enables the information processing apparatus 1 to support an appropriate pyrolysis treatment.

Although the present disclosure has been explained based on embodiments and drawings, it is to be noted that various changes and modifications may be made by those skilled in the art based on the present disclosure. Other modifications can be made without departing from the spirit of the present disclosure. For example, the functions and the like included in the various means and steps may be reordered in any logically consistent way. Furthermore, means and steps may be combined into one or divided. For example, it should be noted that the expressions "first" and "second" in the claims are merely to distinguish between two terms and do not refer to specific subject matter in the specification.

For example, in the above embodiments, a program that executes all or part of the functions or processing of the information processing apparatus 1 can be recorded on a computer-readable recording medium. Computer readable recording media include non-transitory computer readable recording media, examples of which are a magnetic recording apparatus, an optical disc, a magneto-optical recording medium, and a semiconductor memory. The program is, for example, distributed by the sale, transfer, or lending of a portable recording medium such as a digital versatile disk (DVD) or a compact disk read only memory (CD-ROM) on which the program is recorded. The program may also be distributed by storing the program in the storage of any server and transmitting the program from any server to another computer. The program may also be provided as a program product. The present disclosure can also be embodied as a program executable by a processor.

For example, the computer can temporarily store, in the main memory, the program recorded on the portable recording medium or transferred from the server. The computer uses a processor to read the program stored in the main memory and executes processing with the processor in accordance with the read program. The computer may read the program directly from the portable recording medium and execute processing in accordance with the program. Each time the program is transferred from the server to the computer, the computer may sequentially execute processing in accordance with the received program. Processing may be executed by an ASP type of service that implements functions only via execution instructions and result acquisition, without transferring the program from the server to the computer. "ASP" is an abbreviation of application service provider. Examples of the program include an equivalent to the program represented as information provided for processing by an electronic computer. For example, data that is not a direct command for a computer but that has the property of specifying processing by the computer corresponds to the "equivalent to the program".

REFERENCE SIGNS LIST

1 Information processing apparatus

The invention claimed is:

1. An information processing apparatus capable of communicating with a network and comprising a controller, the controller being configured to execute operations comprising:

receiving first tire-related information about a tire from a first communication terminal associated with a first stage in recycling of tires;

receiving second tire-related information about the tire from a second communication terminal associated with a second stage in the recycling, wherein the second stage is a stage of pyrolysis of the tire;

determining decomposition condition information for the second stage by utilizing the compounding information included in the first tire-related information;

transmitting the determined decomposition condition information corresponding to compounding information included in the first tire-related information to the second communication terminal associated with the second stage to control a pyrolysis process in the second stage;

storing the first tire-related information and the second tire-related information in association with identification information for the tire; and transmitting, upon receiving the identification information from a user terminal, the first tire-related information and the second tire-related information to the user terminal.

2. The information processing apparatus according to claim 1, wherein the information processing apparatus is one node of a blockchain network, and the operations include storing the first tire-related information and the second tire-related information in association with the identification information in a blockchain.

3. The information processing apparatus according to claim 1, wherein a QR code® including the identification information, a bar code including the identification information, or an RFID chip storing the identification information is attached to or embedded in the tire, or a chemical marker associated with the identification information is compounded with or applied to rubber used in the tire.

4. The information processing apparatus according to claim 1, wherein the first tire-related information includes information on a percentage of recycled material used in the tire.

5. The information processing apparatus according to claim 1, wherein the first stage is a stage of selling the tire, and the operations include identifying a customer who purchased the tire from the first tire-related information and transmitting service information to a user terminal operated by the customer.

6. The information processing apparatus according to claim 1, wherein the first stage is a stage of selling the tire, the second stage is a stage of collecting a used tire, and the operations include calculating, from the first tire-related information and the second tire-related information, a percentage of one or more tires collected among one or more tires sold.

7. A program configured to cause a computer to function as the information processing apparatus according to claim 1.

8. An information processing method for an information processing apparatus capable of communicating with a network, the information processing method comprising:

receiving first tire-related information about a tire from a first communication terminal associated with a first stage in recycling of tires;

receiving second tire-related information about the tire from a second communication terminal associated with a second stage in the recycling, wherein the second stage is a stage of pyrolysis of the tire;

determining decomposition condition information for the second stage by utilizing the compounding information included in the first tire-related information;

transmitting the determined decomposition condition information corresponding to compounding information included in the first tire-related information to the second communication terminal associated with the second stage to control a pyrolysis process in the second stage;

storing the first tire-related information and the second tire-related information in association with identification information for the tire; and transmitting, upon receiving the identification information from a user terminal, the first tire-related information and the second tire-related information to the user terminal.

* * * * *